United States Patent

[11] 3,615,364

[72] Inventor Irving Rubak
 Bronx, N.Y.
[21] Appl. No. 862,805
[22] Filed Oct. 1, 1969
[45] Patented Oct. 26, 1971
[73] Assignee Treadwell Corporation
 New York, N.Y.

[54] REDUCTION OF CUPROUS CYANIDE WITH HYDROGEN IN A LIQUID MEDIUM
10 Claims, 2 Drawing Figs.

[52] U.S. Cl. .................................................. 75/108,
 75/.5 A, 75/117
[51] Int. Cl. ........................................... C22b 15/08,
 C22b 15/12
[50] Field of Search .......................................... 75/.5 A,
 106, 117, 108

[56] References Cited
UNITED STATES PATENTS
2,740,708 4/1956 Papee ........................... 75/.5 A
3,515,539 6/1970 Wethern ....................... 75/.5 A
3,532,490 10/1970 Burkin .......................... 75/.5 A Primary Examiner—L. Dewayne Rutledge
Assistant Examiner—W. W. Stallard
Attorneys—Robert Ames Norton and Saul Leitner ABSTRACT: Cuprous cyanide is dispersed in a high boiling hydrocarbon oil nonreactive with hydrogen, copper or HCN, such as a paraffin mineral oil, and hydrogen is passed through at temperatures from 190° C. to temperatures at or a little below the boiling point of the oil. With an oil boiling above 325° C., suitable temperatures are from a little below 300° C. to approximately 325° C. Hydrogen is passed through at a rate and for a time to produce a substantial excess, for example at least 50 percent excess, and the cuprous cyanide is reduced almost quantitatively to a very pure copper powder. After reduction is complete, the copper powder is separated from the oil, the last traces of oil being removed by known means, such as solvent washing, or removed when the copper is melted. The excess hydrogen carries with it HCN formed in the reduction, and the two are separated and reused.

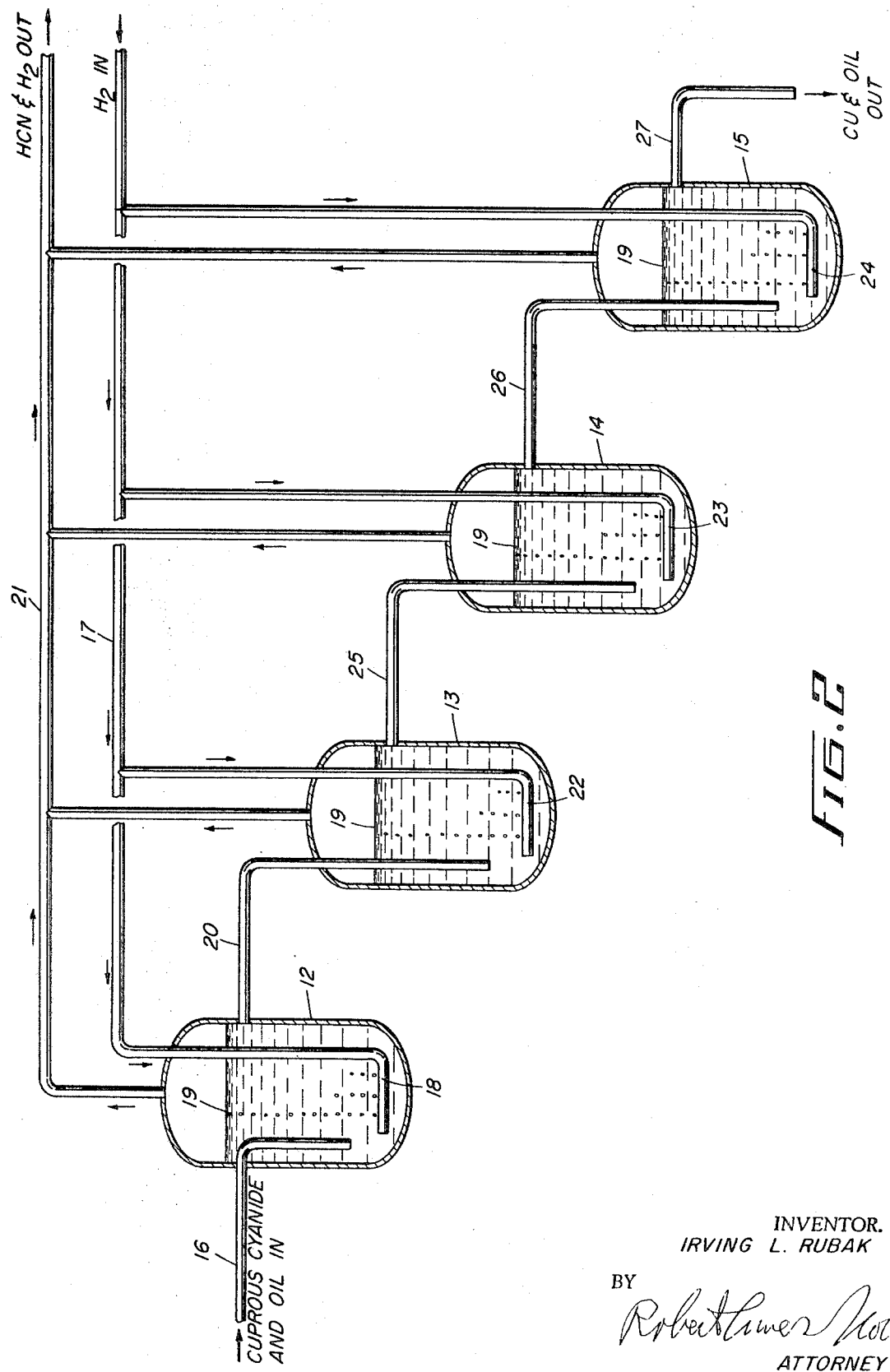

REDUCTION OF CUPROUS CYANIDE WITH HYDROGEN IN A LIQUID MEDIUM

RELATED APPLICATION AND BACKGROUND OF THE INVENTION

In the patent to Roberts U.S. Pat. No. 3,321,303 issued May 23, 1967, and assigned to the Treadwell Corporation, the assignee of the present application, there is described a process for producing pure copper from solutions of copper salts, particularly cupric sulfate. The process is carried out in two steps: Cuprous cyanide is first produced, preferably in strongly acid solution, by reaction of HCN in the presence of a reducing agent, such as sulfur dioxide or finely divided metallic copper, which may be a portion of the copper produced in the process. This step of the process depends on the unique property of cuprous cyanide of being insoluble in acid solution and capable of being formed in high, almost quantitative yields. The second step takes the cuprous cyanide after separation and reduces it with hydrogen at temperatures between 190° and 600° C., the hydrogen being in very substantial excess, usually at least 50 percent or more. The second step is based on the surprising discovery that although at these high temperatures most cyanides react with hydrogen to form products in which HCN is decomposed, in the case of cuprous cyanide the reaction is substantially quantitative, better than 98 percent, and the amount of decomposition of HCN is negligible.

In practical commercial operation certain manufacturing problems have arisen which have nothing to do with the basic new process. In the cuprous cyanide reduction step, if the product is in the form of a fine powder, operating steps have to be at moderate rates in order to prevent blowing out of the finely divided cuprous cyanide and/or the equally finely divided copper which is produced by the reduction with hydrogen. It is, therefore, common to pelletize the cuprous cyanide. This eliminates losses of cuprous cyanide blown through by the stream of hydrogen and permits considerably faster operating rates.

However, even with pellets there are certain limits on the maximum rate at which the operation can be carried out by reason of the fact that if external heating is used for part or all of the heat, the heat transfer is not instantaneous and so sets a limit on the rate at which the process can be carried out. It is, of course, possible to supply all of the heat by preheating the hydrogen. However, this requires more elaborate heat transfer equipment and produces a relatively high-temperature exit gas of hydrogen and HCN. This heat is normally lost because in separating the hydrogen from the HCN this has to be effected either by solution in aqueous solutions or by chilling. The separated hydrogen, of course, can be preheated to some extent by heat exchange with the hot exit gases, but even so there is a certain economic loss, which, although sufficiently low so that the Roberts process represents a real economic advance in savings in the cost of producing copper, still the small costs due to heat loss are of economic significance in huge commercial plants treating many hundreds of tons per day.

Another factor of small increased cost is the fact that the cuprous cyanide was produced in an aqueous solution and the water had to be removed; and if pelletizing is used, pellets may be wet, and there are water seals in the equipment reducing the cuprous cyanide to copper and HCN, which seals are normally necessary because of the highly toxic nature of the HCN produced. This amount of moisture also represents heat losses.

SUMMARY OF THE INVENTION

It is with certain improvements in the manufacturing operation of the second step of the Roberts process, namely the reduction of cuprous cyanide with hydrogen at high temperatures, that the present invention deals. The invention is, of course, not concerned with the past history of the cuprous cyanide, but the first stop of the Roberts process is a very desirable source of the cuprous cyanide for the present process.

Essentially, the present invention is based on carrying out the hydrogen reduction with cuprous cyanide, preferably in finely divided form, suspended in an oil which is nonreactive with hydrogen, copper or HCN. Paraffin oils are preferred, but the particular source of the paraffin oil is not at all critical. The oil must, however, be of reasonable purity, that is, it is normally a refined petroleum product since refined crude oil contains constituents which are reactive with copper, hydrogen or HCN. The oil must have a boiling point sufficiently high so that under the pressure used it does not boil. Atmospheric pressure is normally preferred as it avoids the complications of operating under pressure.

Heat transfer is by external heating to the high-boiling oil and through it to the cuprous cyanide. This is much more rapid than with the solid forms of cuprous cyanide, and therefore it is not necessary to introduce most of the heat by preheating the hydrogen to a high degree, and substantial savings on heating equipment thus become possible. This is not to say that the hydrogen should not be preheated, and to the extend that this is feasible by heat exchange with the hot exit gases, it represents a desirable saving, thus further augmenting the operating economies of the process of the present invention.

Another practical operating advantage is that there is no problem with blowing away finely divided cuprous cyanide, and therefore it is not necessary to form it into pellets, though of course this can be done. The finely divided cuprous cyanide suspended in the oil has a very large surface to the hydrogen bubbled through and rapid reaction rates are achievable. Finally, there is a further advantage that it is not as necessary to dry the cuprous cyanide and a damp cake may be used or, if the cyanide is introduced through a water seal, any moisture it picks up is rapidly boiled off as the oil is heated up and comes off with the excess hydrogen and HCN. It is true that the heat to vaporize the water is still needed, but the heat transfer is so much more efficient and rapid into the oil that this does not involve significant additional costs, and the elimination of drying thus represents a further operative saving. It is preferred to use a product that does not have a high moisture content. This avoids certain operating problems, such as foaming, bumping, and the like.

As in any reaction between a gas and solids in suspension, reasonable good maintenance of a dispersed form is necessary for good outputs. In general it is preferable to provide some mechanical stirring, but of course the bubbling of the hydrogen through the oil itself effects a very considerable amount of agitation and thus augments any further mechanical agitation. It is, of course, possible to agitate only by the bubbling of hydrogen through the oil, but in general, since mechanical agitation is so easily provided, it is preferred to have both forms of agitation.

While the present invention permits worthwhile operating economies, it does not significantly improve the efficiency of the reaction, which is already substantially quantitative. On the other hand, no adverse effects are noted, so that the operational savings are obtained without any offsetting drawbacks.

It should be noted that not only does the present invention effect important manufacturing improvements, but the product produced is actually different from that in the Roberts process. The finely divided product in the Roberts process does not shown a crystal structure by ordinary means, Such as X-ray diffraction. This does not necessarily means that the powder may not constitute very small crystals. However, they are too small to show up on X-ray diffraction examination. The product of the present invention, however, tends to aggregate and often produces larger aggregates some of which are quite large and have a shiny coating on the outside.

The use of a high-boiling in the present process not only improves heat transfer but also makes for other equipment advantages. As air had to be excluded, powder feed normally required water seals or similar types of protection. However, the suspended cuprous cyanide in oil can be directly pumped into reacting equipment and so effects significant economy therein while still avoiding the introduction of air.

The range of temperatures which can be used is fairly broad and ranges from a low of 190° C. to a temperature just below of the boiling point of the high-boiling oil. However near the lower limit the reaction is rather slow and so when an oil is used which is sufficiently high boiling it is preferable to maintain the temperature at least between about 300° C. and the boiling point of the oil.

BRIEF DESCRIPTION OF THE DRAWINGS

FIG. 2 is a purely diagrammatic representation of a series of reactors through which the oil suspension of cuprous cyanide passes, thus permitting a continuous process.

DESCRIPTION OF THE PREFERRED EMBODIMENTS

Figure 1:
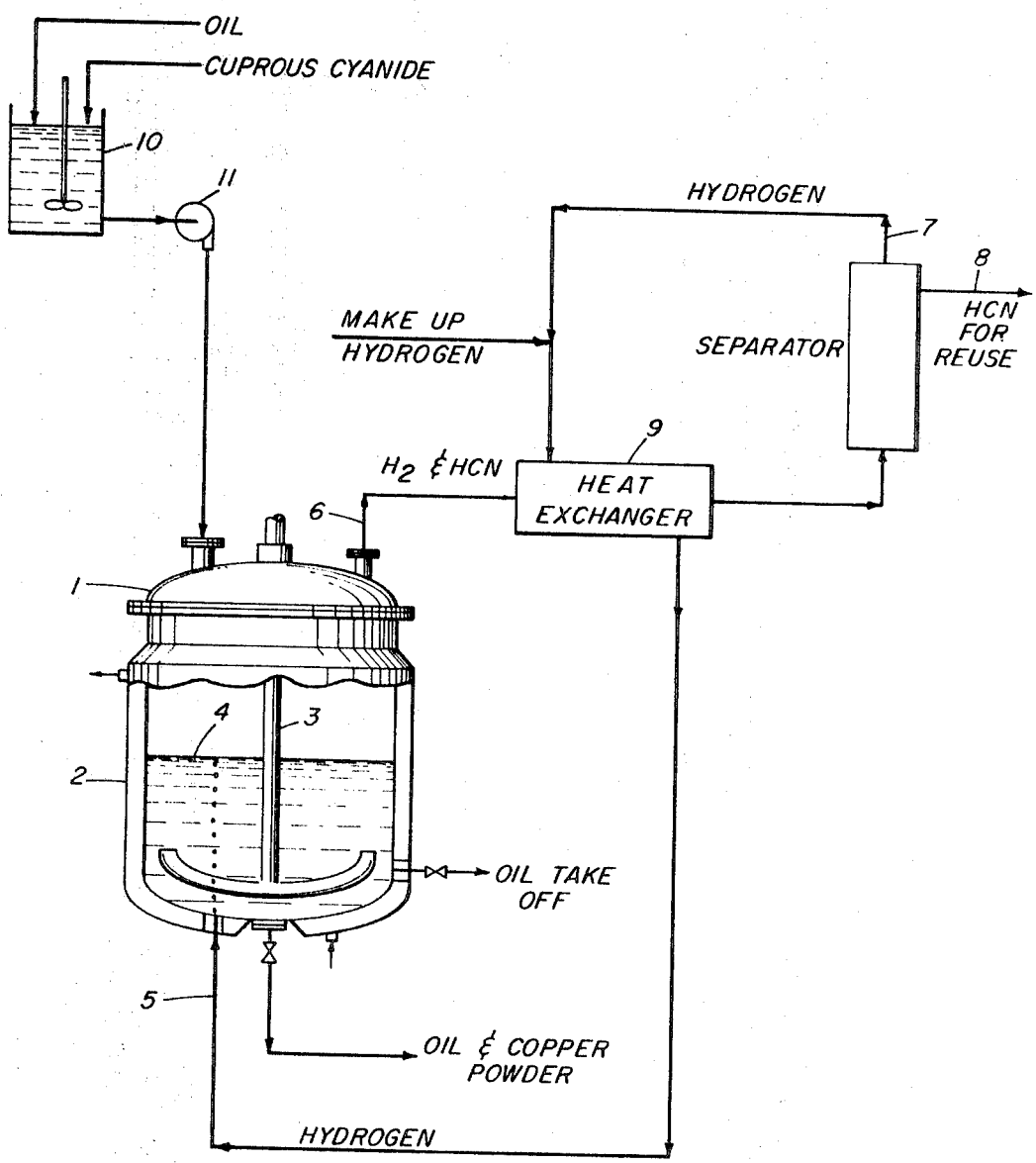
FIG. 1 is a semidiagrammatic showing of a batch operation with certain portions of the apparatus shown in section.

In order to describe more simply the essentials of the process, including certain reactant quantities, it is simpler and easier to describe the process in the form of a batch process, although for large-scale operation the continuous process, which will be briefly described below, presents many operating advantages.

FIG. 1 is semidiagrammatic in nature as the equipment used is of standard design. The reactor is shown at 1 as a section through an agitated kettle with a heating jacket 2, agitator 3, and oil level 4. The agitator, as is customary, is driven, and since the drive can be conventional it is not shown. Preheated hydrogen is introduced below the surface of the oil by a pipe 5 and after bubbling through, leaves by pipe 6 to a conventional hydrogen—HCN separator. As this is a well known form of apparatus it is shown in purely diagrammatic form, hydrogen leaving through the pipe 7 and HCN through the pipe 8. The separator requires lowering the temperature, which is effected in a heat exchanger 9 through which separated hydrogen passes, being preheated by the hot exit gases in the pipe 6. Cuprous cyanide is first slurried in the oil, such as a paraffin oil, in a mixing tank 10 from which it is pumped into the reaction vessel by the pump 11. If the operation is carried out as a batch operation, after the reaction is complete most of the oil is decanted from the copper powder produced, which sinks to the bottom of the kettle after agitation ceases. A small amount of oil with the powder is then drained off through the drain 11 and the oil is either removed from the copper by washing with a solvent, or if the copper is to be melted and cast, the small amount of adhering oil can be burned off in the melting furnace. Whether it is preferable economically to recover this small amount of oil or better to burn it off is purely an economic question and shows one of the operating advantages of the process, which is quite flexible.

A typical batch operating example is as follows: 100 parts of cuprous cyanide is introduced into the oil, the agitator started, air removed by blowing nitrogen through, and the oil heated up to about 300° C. Hydrogen is then introduced under a slight pressure, for example about one inch of mercury, and the temperature permitted to climb to 325° C. by reason of the heat introduced through the hydrogen and through the heating jacket of the reaction vessel. The temperature is maintained until the reaction is substantially complete, which may take about 3 hours or slightly more. Just under 30 parts of HCN is produced, representing a conversion of about 98 percent.

After the reaction is completed, agitation is stopped, most of the oil decanted off, and a small amount of oil with the copper powder which sank to the bottom of the reactor drawn off and removed by solvent cleaning and drying. The pure copper powder produced is a dense and flowable product which shows very high reactivity. The effluent gases containing the excess of hydrogen, for example, somewhat over 100 percent, are cooled down, the two gases separated, and the hydrogen recycled after preheating, additional makeup hydrogen, of course, being supplied.

FIG. 2 illustrates four reactors 12, 13, 14 and 15 in series. As the drawing is purely diagrammatic since standard forms of equipment can be used, the agitators are not shown, though it is usually desirable to provide agitation, as is described in FIG. 1. The suspension of cuprous cyanide in oil is introduced through pipe 16 to the bottom of reaction vessel 12. Preheated hydrogen is introduced from a hydrogen manifold 17 through a diffuser 18, which is shown purely diagrammatically as it is a well-known design. In each of the reaction vessels 12, 13, 14 and 15 the oil is maintained at a certain level, which is indicated at 19 in all four vessels. Oil containing partly reacted cuprous cyanide overflows through pipe 20 into the bottom of reactor 13. The hydrogen introduced through the diffuser 18 bubbles up and carries off HCN to a hydrogen-HCN manifold 21. In reactor 13 the preheated hydrogen is introduced through a diffuser 22 and the same occurs through diffusers 23 and 24 in the other reaction vessels 14 and 15. The reaction continues in reactor 13 as has been described in connection with reactor 12 and the excess hydrogen carries off HCN formed into the manifold 21. Further reacted oil CuCN slurry overflows from reactor 13 through pipe 25 into reactor 14, where the reaction further continues as has been described. Finally, the slurry overflows from reactor 14 through the pipe 26 into the bottom of reactor 15, where the same reaction with hydrogen continues as has been described.

The number of reactors in series is not critical but they must be sufficient so that the reaction is substantially complete in the last reactor. Normally there will be about four to six reactors in series. In FIG. 2 the slurry of the reduced copper overflows through pipe 27 where the copper is separated from the oil as has been described in connection with FIG. 1. The continuous process operates under substantially the same temperature conditions as has been described in connection with FIG. 1 and the mixture of HCN and hydrogen leaving through the manifold 21 is cooled and separated as described in conjunction with FIG. 1, the hydrogen being preheated in a heat exchanger which cools down the exhaust gases and permits separation of the HCN for reuse. The separated hydrogen, of course with additional makeup hydrogen, is recirculated in the same manner as in FIG. 1 and is preheated in the heat exchanger. This portion of the flow sheet is not changed by the continuous process of FIG. 1 and is, therefore, not repeated here.

I claim:

1. In a process for reducing cuprous cyanide at elevated temperatures with excess hydrogen to metallic copper, separating the hydrogen from the hydrocyanic acid produced, and recycling the hydrogen, the improvement which comprises suspending cuprous cyanide in a high-boiling oil, which oil is inert to hydrogen, copper and HCN, heating up the oil and passing hydrogen in substantial excess therethrough, the temperature during the reaction ranging from about 190° C. to a temperature below that at which the oil boils under the conditions of reaction, the hydrogen passage being continued until the reduction of the cuprous cyanide to metallic copper is complete, and recovering the copper from the oil and reusing the latter.

2. A process according to claim 1 in which the temperature during reaction ranges from about 300° C. to the temperature below at which the oil boils.

3. A process according to claim 2 in which the oil is a high-boiling paraffin oil.

4. A process according to claim 3 in which the reaction of hydrogen with cuprous cyanide is at substantially atmospheric pressure.

5. A process according to claim 2 in which the reaction of hydrogen with cuprous cyanide is at substantially atmospheric pressure.

6. A process according to claim 2 in which the hydrogen and hydrocyanic acid gases produced by the reaction are cooled down and are separated from each other and oil vapor, the cooling being effected by heat exchange with separated hydrogen, whereby the latter is preheated.

7. A process according to claim 3 in which the hydrogen and hydrocyanic acid gases produced by the reaction are cooled down and are separated from each other and oil vapor, the cooling being effected by heat exchange with separated hydrogen, whereby the latter is preheated.

8. A process according to claim 4 in which the hydrogen and hydrocyanic acid gases produced by the reaction are cooled down and are separated from each other and oil vapor, the cooling being effected by heat exchange with separated hydrogen, whereby the latter is preheated.

9. A process according to claim 5 in which the hydrogen and hydrocyanic acid gases produced by the reaction are cooled down and are separated from each other and oil vapor, the cooling being effected by heat exchange with separated hydrogen, whereby the latter is preheated.

10. A continuous process according to claim 2 in which the suspension of cuprous cyanide is introduced into a first reaction vessel through which the hydrogen is passed, excess hydrogen and HCN are removed, and the suspension of partially reduced cuprous cyanide in oil is overflowed into a succeeding reactor through which further hydrogen is passed and overflow repeated to further reactors in series until the cuprous cyanide is substantially completely reduced in the last reactor and the suspension of copper in oil is overflowed from the last reactor and the copper separated and recovered.

* * * * *